United States Patent [19]

Nakamura

[11] Patent Number: 4,533,848
[45] Date of Patent: Aug. 6, 1985

[54] ROTOR OF CORELESS MOTOR

[75] Inventor: Yoshimitsu Nakamura, Settsu, Japan

[73] Assignee: Matsushita Electric Works, Ltd., Osaka, Japan

[21] Appl. No.: 107,644

[22] Filed: Dec. 27, 1979

Related U.S. Application Data

[63] Continuation of Ser. No. 908,373, May 22, 1978.

[30] Foreign Application Priority Data

May 27, 1977 [JP] Japan .................................. 52-69093

[51] Int. Cl.³ ............................................. H02K 13/04
[52] U.S. Cl. ............................... 310/237; 310/40 MM; 310/154; 310/266
[58] Field of Search ............... 310/266, 268, 237, 154, 310/40 MM

[56] References Cited

U.S. PATENT DOCUMENTS

| 3,095,516 | 6/1963 | Moressee et al. | 310/237 X |
| 3,244,917 | 4/1966 | Gute | 310/237 X |
| 3,356,877 | 12/1967 | Burr | 310/154 |
| 4,099,077 | 7/1978 | Maekawa | 310/237 |
| 4,103,196 | 7/1978 | Saito et al. | 310/237 X |

FOREIGN PATENT DOCUMENTS 52-35803  3/1977  Japan .................................. 310/237

Primary Examiner—Mark O. Budd
Attorney, Agent, or Firm—Burns, Doane, Swecker & Mathis

[57] ABSTRACT

A rotor of a coreless motor high in mechanical strength and durable against a high torque for a long time is provided. A non-metal disk member is provided for holding a cylindrically wound coil secured at its one axial end to the periphery of the disk in coaxial relation to a metallic rotary shaft coupled at one end to the disk member whereby the coupling force between the disk member and the rotary shaft is made high. The disk member and rotary shaft may be made into an integral body with the same metal material. Commutator segments for feeding a source current to the coil are provided on the disk member through an insulative layer.

2 Claims, 8 Drawing Figures

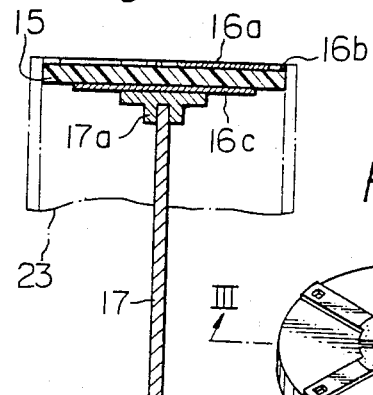
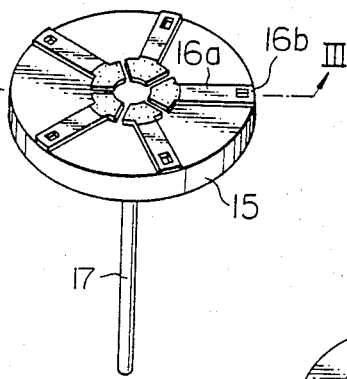
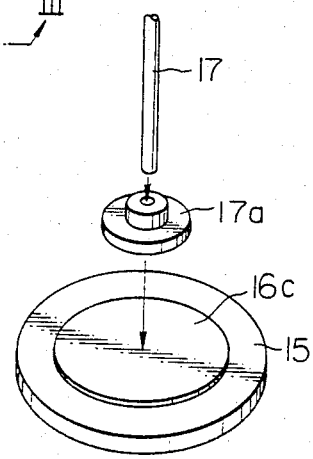
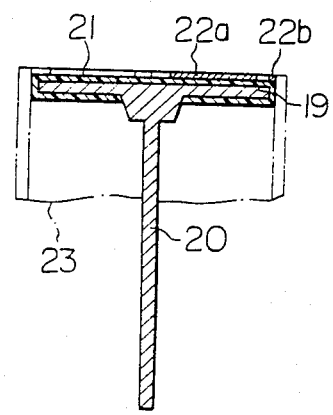
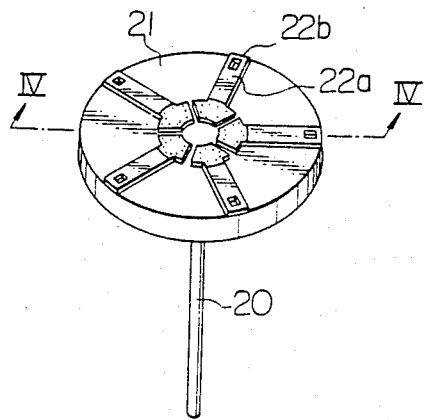

ROTOR OF CORELESS MOTOR

This is a continuation of application Ser. No. 908,373, filed May 22, 1978.

This invention relates to a rotor structure of a coreless motor and, more particularly, to improvements in the rotor of a cylindrically wound coil provided at an axial end with commutator segments and rotatably disposed in a cylindrical magnetic gap of a stator arrangement of the coreless motor.

Generally, the rotor of the coreless motor is of such structure that a mostly plastic insulative disk is secured to the inner periphery at an axial end of the cylindrically wound coil. A rotary shaft of the rotor is fixed at its one end to the center of the inner surface of the disk coaxially with the cylindrical coil. A plurality of the commutator segments are radially arranged on the other outer surface of the disk and connected at their outward extended ends to exposed conductors of the coil at the axial end. In this structure of the rotor, the rotary shaft, made of a metal, is fixed to the plastic disk, the latter holding the coil as well as the commutator segments with respect to the shaft. Due to the different materials of the shaft and disk, their mechanical coupling is insufficient, whereby the mechanical strength of the rotor is not high and eventually the life of the entire motor is not long. The present invention has been suggested in view of this defect of conventional coreless motors.

According to the present invention, the defect has been successfully removed by forming a metallic part at least at the central part of the coil holding disk and coupling the metal rotary shaft to the metallic part.

A primary object of the present invention is, therefore, to provide a rotor of a coreless motor having a high mechanical strength and thus capable of providing a prolonged life to the motor.

Another object of the present invention is to provide a rotor of a coreless motor that can be made at lower costs.

A related object of the present invention is to provide a rotor of a coreless motor which is adapted to a higher output torque of the motor.

Other objects and advantages of the present invention shall be made clear in the following descriptions thereof detailed with reference to certain preferred embodiments of the invention as shown in accompanying drawings, in which:

FIGS. 2A and 2B show an embodiment of the present invention, in which FIG. 2A is a vertically sectioned view of a rotor according to the present invention along line II—II in FIG. 2B which is a perspective view of the rotor;

FIGS. 3A through 3C show another embodiment of the present invention, in which FIG. 3A is a vertically sectioned view of a rotor taken along line III—III in FIG. 3B showing the rotor in a perspective view and FIG. 3C shows the rotor in a state before assembled also in a perspective view but as seen on the other side than that of FIG. 3B; and FIGS. 4A and 4B show a further embodiment of the rotor according to the present invention in a vertically sectioned view of FIG. 4A taken along line IV—IV in FIG. 4B showing the same in a perspective view.

Figure 1:
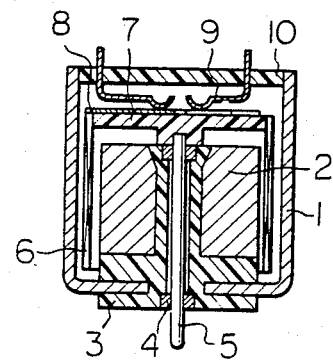
FIG. 1 is a vertically sectioned elevation of a coreless motor employing a conventional rotor.

Referring first to general structure of a coreless motor with reference to FIG. 1 in which a conventional rotor is employed, a substantially cup-shaped stator yoke 1 acting as a motor housing accommodates therein an axial magnetic pole member 2. The member 2 comprises a cylindrical permanent magnet and is secured to the bottom of the cup-shaped yoke 1 by means of a fixing member 3 which extends over the length of axial bore of the cylindrical magnet 2 and out of the bottom of the yoke 1. The member 3 thus secures the magnet to the yoke and supports in the axial hole an axial rotary shaft 5 of a cylindrical rotor coil 6 by means of a pair of shaft bearings 4 of a non-magnetic material. The rotary shaft 5, made of a metal, and the coil 6 are coupled integral by means of a disk member 7 of such an electrically insulative and non-magnetic material as a synthetic resin. The disk member 7 is secured to the inner periphery of the coil at an axial end opening of the cylindrical coil 6. The metal shaft 5 is embedded at its one end in the center of the disk 7 in coaxial relation to the cylindrical coil 6. On the other outer surface of the disk 7, there are secured a plurality of commutator segments 8, which are separated from each other and extend radially from the central area of the disk to a position above the axial end of the cylindrical coil 6. At such position folded back wire of the coil as wound into the cylindrical shape has been preliminarily processed to expose inner conductors with their insulation coating removed. Such exposed conductors are located at equally spaced positions on the particular axial end of the cylindrical shape. The radially extended ends of the respective segments 8 are electrically connected to the exposed coil conductor as by being soldered thereto. The thus assembled rotor comprising the shaft 5, coil 6, disk 7 and commutator segments 8 is associated with the stator yoke 1 and magnet 2 such that the cylindrical coil 6 is disposed in a cylindrical magnetic gap formed between the inner peripheral wall of the yoke 1 and the outer peripheral wall of the magnet 2 so as to be rotatable with the shaft as the center. A pair of contactor brushes 9 secured to an insulative closure disk 10 closing the open end of the cup-shaped yoke 1 are brought into slidable contact with the commutator segments on the rotor for feeding an electric current to respective sections of the coil divided between the respective exposed positions of the coil conductor.

In the above described structure of the coreless motor, the cylindrical coil 6 disposed in the stator magnetic gap is caused to rotate with the shaft 5 as the center when an electric current is conducted through the respective sections of the coil. Such rotation of the rotor is provided at the exposed end of the shaft 5 out of the yoke 1 to deliver the output torque of the motor. However, since the metallic shaft 5 is coupled with the coil 6 through the plastic disk 7 by simply being endwise embedded in the disk 7 of the different material, the mechanical coupling force between the shaft 5 and the disk 7 is not sufficient enough for resisting the torque or a load applied to the extended end of the shaft (especially when the motor is designed to be of a higher output torque type), even if measures are taken at the embedded portion of the shaft for strengthening its coupling with the disk.

Figure 2A:
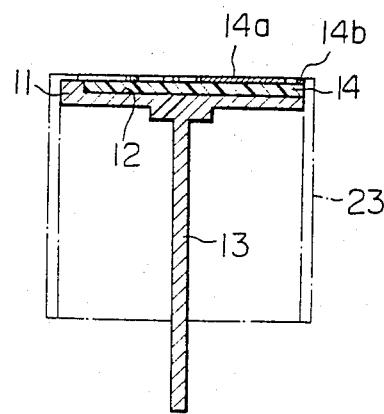
Figure 2B:
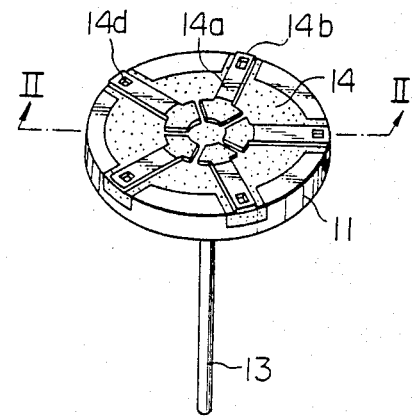

Referring now to an embodiment of the rotor according to the present invention as shown in FIGS. 2A and 2B, a disk member 11 is made of a non-magnetic metal so as to have in one surface thereof a substantially circular recess 12 and on the other surface an integrally formed rotary shaft 13. The shaft extends perpendicularly vertically with respect to the plane of the disk 11 at its center. The integral formation of the disk 11 and shaft 13 is preferably performed by means of a forging or the like. The recess 12 is radially extended at a plurality of equally spaced positions to the periphery of the disk 11. An insulative plate 14 of a complementary shape to the recess 12 and made of, for example, a synthetic resin is fitted and fixed in the recess 12. A plurality of commutator segments 14a respectively of a substantially arrow shape and of an electric conductive metal are fixed to the plate 14 and are arranged radially. Respective sector shaped and preferably gold-plated inward ends of the segments 14a are disposed in the central area of the plate for slidable contact with the source current distributing brushes. Respective outward ends 14b of the segments are disposed on the respective radial extensions of the insulative plate 14 and terminate at the periphery of the disk 11 for electric connection with the endwise exposed conductor of the cylindrical coil as referred to with reference to FIG. 1. For the electric connection, each of the segments 14a is provided adjacent the outward end 14b with a recess or aperture 14d for the purpose of retaining therein welding solder placed across the coil conductor and the end of the segment and thus preventing any over flow of the solder out of the respective segments 14a. The cylindrical coil represented by a broken line 23 in FIG. 2A is fitted to the periphery of the disk 11 so as to be secured thereto by means of a bonding agent at the inner periphery adjacent an axial end of the cylindrical coil 23, so that the rotary shaft 13 will extend coaxially through the inside of the coil and the commutator segments 14a will be disposed on the exterior of the coil end. Thus, the rotor of the coreless motor is formed.

While, in the above described embodiment, the insulative plate 14 is made to be shaped complementary to the recess 12 having the radial extensions, the plate 14 may be formed in a simple disk shape so as to be secured to a flat surface of the disk 11, whereby the rotor structure can be simplified. On the other hand, the structure as shown in FIGS. 2A and 2B provides a higher mechanical coupling between the metal disk 11 and the insulative plate 14, in addition to the high mechanical strength of the shaft 13 formed integrally with the disk 11.

In FIGS. 3A through 3C, now, there is shown a second embodiment of the rotor, in which a disk-shaped substrate member 15 of an insulative material such as a synthetic resin is provided on both surfaces an electrically conductive but non-magnetic metal layer so as to form a laminated member. Preferably, a copper foil is adhered to both surfaces of the disk 15. The foil on one of the surfaces is treated through a chemical corrosion (i.e., etching) process for forming a plurality of commutator segments 16a respectively having an outward extended end 16b to be connected to the coil conductor and arranged in the similar manner to those in the first embodiment of FIGS. 2A and 2B, and the foil on the other surface is made to be a disk-shape metal layer 16c utilized for coupling thereto a metallic rotary shaft 17 of the rotor. The shaft 17 is tightly fitted at its one end, for example, to an axial hole of a coupling metal fixture 17a having a flange providing an expanded flat surface perpendicular to the shaft 17. The thus coupled shaft 17 and fixture 17a are secured to the central part of the metal layer 16c with the flat surface of the fixture 17a preferably soldered to the layer 16c so that the shaft 17 will extend perpendicularly with respect to the disk 15. Accordingly, the rotor of the coreless motor substantially of the same structure as that of the first embodiment is provided.

According to this embodiment, the rotor can be made in an easier manner yet with a high mechanical strength at the coupling of the shaft to the disk member, since the metal layer 16c is employed for securing thereto the metal fixture 17a at its expanded flat surface. While the metal layer 16c is shown in the drawings as being smaller than the disk 15, the layer 16c may be of even the same diameter as that of the disk 15.

Referring next to a third embodiment of the rotor shown in FIGS. 4A and 4B, a disk member 19 of a relatively small thickness and of a non-magnetic metal is formed integrally with a rotary shaft 20 of the same metal. The shaft is disposed at the center on one surface of the disk 19 and extends perpendicularly therefrom. The metal disk 19 is covered with an electrically insulative layer 21 preferably over both surfaces and periphery. A plurality of commutator segments 22a are secured onto the insulative layer 21 on the other side of the disk 19 opposite to the shaft 20 in a similar manner as in the case of the first or second embodiment. Accordingly, respective outward extended ends 22b of the segments 22a will terminate at the periphery of the disk 19 for electric connection of the segments to the endwise exposed coil conductor of the cylindrical coil 23 secured to the periphery of the disk 19 in a similar manner to the cases of the foregoing embodiments. The segments 22a may be provided either by adhering preliminarily prepared segment pieces to the layer 21 or by means of the chemical corrosion process with any electrically conductive material, and the segments may be plated with copper, nickel, gold or the like for better sliding contact of source current supply with the contactor brushes.

According to the present invention, as has been disclosed in the foregoing, the metal disk integrally coupled to an end part of the metal rotary shaft is employed for holding the cylindrical coil and commutator segments respectively on the periphery and surface of the disk. Accordingly, it is made possible to provide a rotor of a coreless motor which is high in mechanical strength, suitable for being used in the motor of a higher torque and thus of a higher speed rotation, and which can be made at lower costs and still used for a long time.

What is claimed is:

1. A rotor of a coreless motor comprising an electrically insulative substrate of disk shape, a metal foil layer of disk shape having a planar surface portion on each side, one of said planar surface portions being mounted on a planar surface portion of said substrate, rotary metallic shaft means including an elongate shaft, said shaft means including a planar surface portion at one end mounted to the other planar surface portion of said foil layer at the center of said foil layer such that said shaft extends in perpendicular relation to the substrate, the area of said planar surface of said foil mounted to said substrate being larger than the cross-sectional area of said shaft, a cylindrically wound coil secured at an axial end to the periphery of the substrate in coaxial relation to said rotary shaft, and a plurality of commutator segments each formed of a metal foil and being disposed on a surface of said substrate opposite said planar surface portion of said substrate and being electrically connected to exposed conductors at said axial end of said cylindrical coil.

2. Apparatus according to claim 1, wherein said shaft means comprises a metal fitting attached to an end of said shaft, said fitting containing said planar surface portion of said shaft means, said last-named planar surface being larger in area than the cross-sectional area of said shaft and smaller than said area of said planar surface of said foil mounted to said substrate.

* * * * *